(12) United States Patent  
Adams

(10) Patent No.: US 7,831,786 B2  
(45) Date of Patent: Nov. 9, 2010

(54) SHARING MEMORY RESOURCES OF WIRELESS PORTABLE ELECTRONIC DEVICES

(75) Inventor: Neil Adams, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1077 days.

(21) Appl. No.: 11/382,151

(22) Filed: May 8, 2006

(65) Prior Publication Data

US 2007/0260822 A1   Nov. 8, 2007

(51) Int. Cl.  
G06F 12/02 (2006.01)

(52) U.S. Cl. ...................................... 711/161
(58) Field of Classification Search ................. 711/161  
See application file for complete search history.

(56) References Cited

U.S. PATENT DOCUMENTS

| | | | | |
|---|---|---|---|---|
| 5,924,074 | A * | 7/1999 | Evans ............................. | 705/3 |
| 6,158,656 | A * | 12/2000 | Matsumoto et al. ......... | 235/380 |
| 6,371,376 | B1 * | 4/2002 | Dan ........................... | 235/486 |
| 2003/0014370 | A1 * | 1/2003 | Charrin ....................... | 705/65 |
| 2003/0183691 | A1 | 10/2003 | Lahteenmaki et al. | |
| 2004/0131081 | A1 * | 7/2004 | Bhatia et al. ................ | 370/466 |
| 2005/0144520 | A1 * | 6/2005 | Tuma et al. .................... | 714/15 |
| 2006/0179325 | A1 * | 8/2006 | Debiez ....................... | 713/193 |
| 2006/0206569 | A1 * | 9/2006 | Heidloff et al. ............. | 709/206 |
| 2006/0236117 | A1 | 10/2006 | Lazaridis et al. | |

FOREIGN PATENT DOCUMENTS

| | | |
|---|---|---|
| EP | 1316888 | 6/2003 |
| WO | WO 0048384 | 8/2000 |
| WO | 2004012352 | 2/2004 |

OTHER PUBLICATIONS

Slovak, "Absolute Beginner's Guide to Microsoft Office Outlook 2003," Que Publishing, 2003, p. 252 and bibliography coversheet.*
"Overview of Archive and of AutoArchive in Outlook 2003," Microsoft Knowledge Base Article 830119, Microsoft Corporation, Jan. 16, 2004, pp. 1-2.*
"Removing Items From Your Calendar," Microsoft Corporation, 2003, http://office.microsoft.com/en-us/outlook/HA010955511033. aspx.*
Michalakis, Nikolaos, et al., "Designing an NFS-based Mobile Distributed File System for Ephemeral Sharing in Proximity Networks", 2004 4th Workshop on Application and Services in Wireless Networks (ASWN), (2004).

(Continued)

Primary Examiner—Shane M Thomas  
(74) Attorney, Agent, or Firm—Integral Intellectual Property Inc.; Miriam Paton

(57) ABSTRACT

It is not uncommon for two or more wireless-enabled devices to spend most of their time in close proximity to one another. For example, a person may routinely carry a personal digital assistant (PDA) and a portable digital audio/video player, or a cellphone and a PDA, or a smartphone and a gaming device. When it is desirable to increase the memory storage capacity of a first such device, it may be possible to use memory on one or more of the other devices to temporarily store data from the first device.

1 Claim, 4 Drawing Sheets

OTHER PUBLICATIONS

Noll, Joachim, Examination Report for EP 06113650.3, Jan. 2, 2008.
Noll, Joachim, "EESR", Extended European Search Report for EP 06113650.3, Dec. 5, 2006.
"Toshiba Launches Hopbit: Innovative Mobile Pocket Server Combines Bluetooth (TM) Connectivity with High Capacity Data Storage (For the Japanese Market only)", Toshiba: Press Releases Oct. 9, 2002; Http://www.toshiba.co.jp/about/press/2002_10/pr0902.htm, (Oct. 9, 2002).
Chau, Simon, First Office Action for CA 2,586,923, Aug. 27, 2009.
Noll, Joachim, Third Exam Report for EP 06113650.3, Jul. 2, 2009.
Chau, Simon, Second Office Action for CA 2,586,923, Aug. 6, 2010.

* cited by examiner

US 7,831,786 B2

SHARING MEMORY RESOURCES OF WIRELESS PORTABLE ELECTRONIC DEVICES

BACKGROUND

Limited memory resources pose a challenge with some portable electronic devices. Applications installed on a portable electronic device are stored in the device's memory, as are user data items that are used by the applications and system data used by the applications and the operating system of the device. For example, a device having several different applications will store in its memory contact information, e-mail messages, tasks, calendar entries, instant messages, audio files, image files and other forms of user data items.

In order not to waste the limited memory resources, data may be arranged and stored in an efficient manner, and techniques such as compression may be used. A user may also be able to add additional memory to the device, or to replace the existing memory of the device with memory having greater storage capacity. There are also portable memory units that can provide additional storage for the device. For example, if the portable electronic device has a universal serial bus (USB) port and supports the ability to transfer data to an external storage unit, a USB flash drive may be connected to the portable electronic device and the user may transfer data from the device to the drive. In another example, if the portable electronic device is a Bluetooth® (BT) device and supports the ability to transfer data to an external storage unit, then the user may select certain data and transfer the selected data from the device to a dedicated BT hard disk drive.

At some point in time the memory of a portable electronic device may have insufficient capacity to store data in addition to whatever is currently stored therein, or the unused storage capacity of the memory may have fallen below a predetermined threshold. The user of the device may then be prompted to erase some user data items in order to increase the unused storage capacity of the memory. The device may have a memory manager that automatically erases some of the user data items when activated.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

Figure 1:
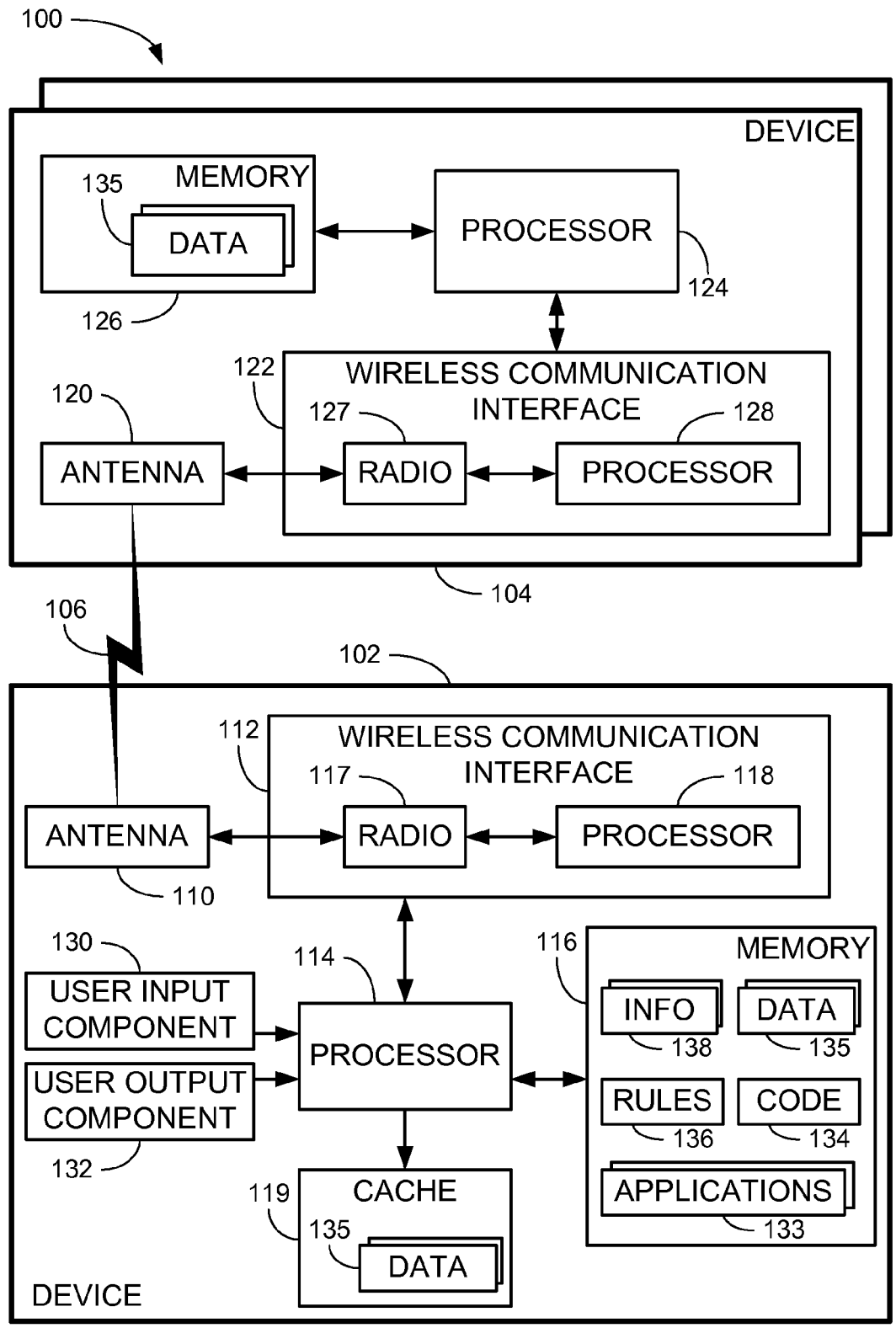
FIG. 1 is a block diagram of an exemplary communications system, according to some embodiments.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

A person using a first wireless portable electronic device with limited memory resources may face a dilemma when the memory of the first device becomes too full. Should user data items be erased from the first device to make room for new data? Should additional memory for the first device be purchased? Should an external storage unit be purchased?

However, the person may also have in his or her possession a second wireless portable electronic device that is often within range of the first device. For example, it is not uncommon for a person to carry a personal digital assistant (PDA) and a portable digital audio/video player, or a cellphone and a PDA, or a smartphone and a gaming device. Some people even carry three or more wireless portable electronic devices. A non-exhaustive list of examples for the devices includes any of the following: personal digital assistants (PDAs), electronic organizers, handheld computers, cellular telephones, smart phones, gaming devices, digital audio players, digital video players, mobile managers, wireless smart card readers and the like.

The first device and the second device may be able to conduct secure wireless communications therebetween using cryptographic techniques and authentication algorithms. A non-exhaustive list of examples of wireless communication protocols with which the first device and the second device may be compatible includes Bluetooth® (BT), ZigBee™, ultra wideband (UWB), wireless USB, IEEE 802.11, radio frequency identification (RFID) protocols, and proprietary communication protocols. The first device and the second device may each have an address by which it can be addressed in the wireless communication protocol. For example, if the devices are BT devices, the first device has a unique BT address and the second device has a unique BT address.

If the second device has unused storage capacity, then data items or portions thereof from the first device may be transmitted via the secure wireless communications to the second device for storage therein. The first device will replace the data item or portion thereof with information that will be used to retrieve the data item or portion thereof from the second device when desired. Since the information occupies less memory than the data item or portion thereof itself, the unused storage capacity of the memory of the first device is increased. Although this description focuses on a first device and a second device, there may be in fact more than one "second device" to which data items are transmitted from the first device for storage therein. A centralized book-keeping application may be used to keep track of where all of the externally stored data items have been moved to. This provides a method for sorting data items by device. In the case where the user wishes to make one of the second devices obsolete, all of the data items stored on that device may be retrieved to the first device and/or re-stored in other locations.

The transfer of data items from the first device to the second device may be initiated by the user of the devices, or may occur automatically when the unused storage capacity of the first device's memory decreases below a threshold, or may occur automatically because a rule applies.

Rules may be applied automatically by the first device in order to determine which data items are transferred to the second device, and in order to determine when, if at all, to transfer the data items back to the first device. The rules may also be applied even if the unused storage capacity of the first device's memory is above the threshold, as a preventative measure. A non-exhaustive list of examples for such rules is given below.

The data items transmitted from the first device to the second device for storage therein could be user data items and/or large system data items that are used infrequently by the first device.

FIG. 1 is a block diagram of an exemplary communications system 100, according to some embodiments. System 100 comprises a first wireless portable electronic device 102 and at least one second wireless portable electronic device 104.

When within range of each other, devices 102 and 104 are able to communicate securely over a wireless communication link 106 using cryptographic techniques.

Device 102 comprises an antenna 110, a wireless communication interface 112, a processor 114 coupled to wireless communication interface 112, and a memory 116 coupled to processor 114. Memory 116 may be fixed in or removable from device 102. Memory 116 may be embedded or partially embedded in processor 114. Processor 114 and memory 116 may be part of the same integrated circuit or in separate integrated circuits. Wireless communication interface 112, compatible with a short-range wireless communication protocol, comprises a radio 117 coupled to antenna 110, and a processor 118 coupled to radio 117. Radio 117 may be a software-defined radio. Wireless communication interface 112 and processor 114 may be part of the same integrated circuit or in separate integrated circuits. Device 102 also comprises a cache 119 coupled to processor 114. Cache 119 may be internal or external to processor 114.

Similarly, device 104 comprises an antenna 120, a wireless communication interface 122, a processor 124 coupled to wireless communication interface 122, and a memory 126 coupled to processor 124. Memory 126 may be fixed in or removable from device 104. Memory 126 may be embedded or partially embedded in processor 124. Processor 124 and memory 126 may be part of the same integrated circuit or in separate integrated circuits. Wireless communication interface 122, compatible with the same short-range wireless communication protocol as wireless communication interface 112, comprises a radio 127 coupled to antenna 120, and a processor 128 coupled to radio 127. Radio 127 may be a software-defined radio. Wireless communication interface 122 and processor 124 may be part of the same integrated circuit or in separate integrated circuits.

A non-exhaustive list of examples for antennae 110 and 120 includes dipole antennae, monopole antennae, multilayer ceramic antennae, planar inverted-F antennae, loop antennae, shot antennae, dual antennae, omnidirectional antennae and any other suitable antennae.

A non-exhaustive list of examples for processors 114, 118, 124 and 128 includes a central processing unit (CPU), a digital signal processor (DSP), a reduced instruction set computer (RISC), a complex instruction set computer (CISC) and the like. Furthermore, processors 114, 118, 124 and 128 may be part of application specific integrated circuits (ASICs) or may be a part of application specific standard products (ASSPs).

A non-exhaustive list of examples for memories 116 and 126 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

Device 102 may comprise a user input component 130 and a user output component 132, both coupled to processor 114. A non-exhaustive list of examples for user input component 130 includes a keyboard, a microphone, a thumbwheel, a trackball, a joystick, a touch sensitive display and the like. A non-exhaustive list of examples for user output component 132 includes a display, a speaker, and the like.

Memory 116 may store applications 133 and code 134 to be executed by processor 114, rules 136 to be implemented by code 134, information 138 about data items or portions thereof that have been stored in device 104, and data items 135.

Devices 102 and 104 may comprise additional components which are not shown in FIG. 1 and which, for clarity, are not described herein.

Figure 2:
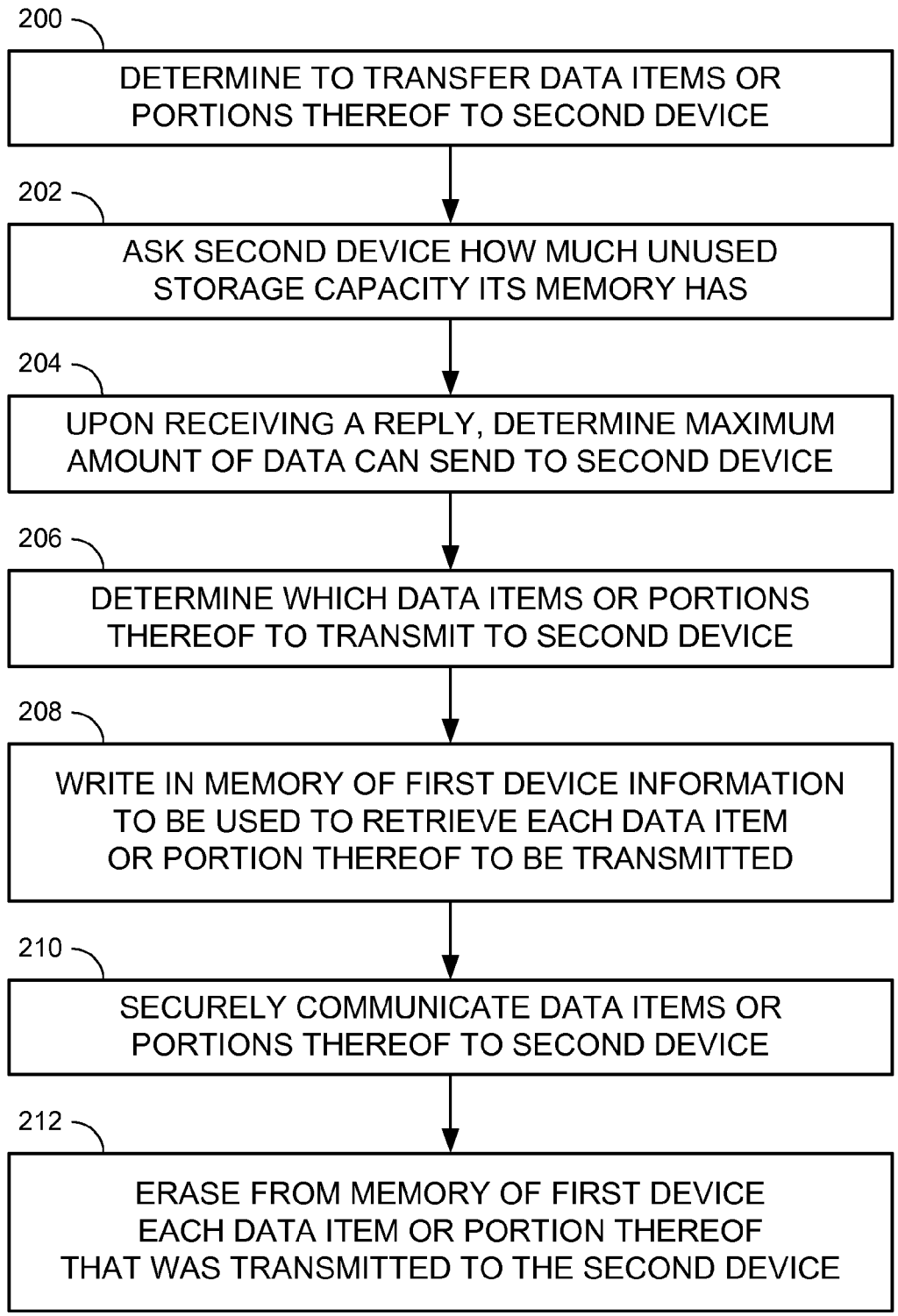
FIG. 2 is a flowchart of an exemplary method for transferring data items or portions thereof to a wireless portable electronic device having unused storage capacity, according to some embodiments.

FIG. 2 is a flowchart of an exemplary method for transferring data items or portions thereof to a wireless portable electronic device having unused storage capacity, according to some embodiments. Code 134 stored in memory 116 may implement the method of FIG. 2 in device 102. The method of FIG. 2 may occur in the background. Alternatively, the user of device 102 may be prompted for permission to perform the method of FIG. 2. Alternatively, the user of device 102 may initiate performance of the method of FIG. 2.

At 200, device 102 determines to transfer at least one data item 135 or portion thereof to another device. This determination may be initiated by the user of device 102, or may occur automatically when the unused storage capacity of memory 116 decreases below a threshold, or may occur automatically because one or more of rules 136 apply.

At 202, device 102 asks device 104 how much unused storage capacity is in memory 126. At 204, upon receiving the storage capacity information from device 104, device 102 determines the maximum amount of data it can send to device 104 for storage in memory 126. The request and reply may be sent over wireless communication link 106, possibly securely. Alternatively, device 104 could send its unused storage capacity information to device 102 periodically or upon connection with device 102 over the wireless communication link 106.

At 206, device 102 determines which data items 135 or portions thereof that are currently stored in memory 116 to transmit to device 104. For example, rules 136 stored in memory 116 may be applied automatically by code 134 in order to determine which data items 135 or portions thereof to transmit to device 104. A non-exhaustive list of examples for such rules is given below.

At 208, device 102 writes information 138 in memory 116. Information 138 is to be used in the future to retrieve from device 104 each data item 135 or portion thereof to be transmitted. Information 138 may include, for example, an address or other indication of device 104. For example, the address may be the media access control address of device 104 or the unique BT address of device 104, if device 104 is a BT device. Information 138 may include, for example, a short summary of data item 135 or portion thereof. Information 138, or a portion thereof, may be stored using a centralized bookkeeping application in order to keep track of where all of the externally stored data items have been moved to.

At 210, device 102 securely transmits data items 135 or portions thereof, as determined at 206, to device 104 over wireless communication link 106 using cryptographic techniques and authentication algorithms. Upon receipt, device 104 stores data items 135 or portions thereof in memory 126. Devices 102 and 104 may have similar file systems and store data items 135 or portions thereof in the same way. Alternatively, device 102 and 104 may have different file systems and store data items 135 or portions thereof in different ways. Since data items 135 or portions thereof are serialized prior to transmission over link 106, the file systems of device 102 and device 104 need not be the same or similar.

At 212, once device 102 has received confirmation from device 104 that data items 135 or portions thereof were successfully received, device 102 erases from memory 116 the data items 135 or portions thereof that were transmitted to device 104.

Instead of asking device 104 how much unused storage capacity it has in memory 126, device 102 may begin the method of FIG. 2 at 206 and risk that device 104 will refuse to store all or some of the data items 135 or portions thereof that are transmitted at 210. In this embodiment, device 102 only erases the data items 135 for which it receives a confirmation of successful receipt from device 104. In this manner, the data items 135 that device 104 refuses to store will not be inadvertently erased from device 102.

Figure 3:
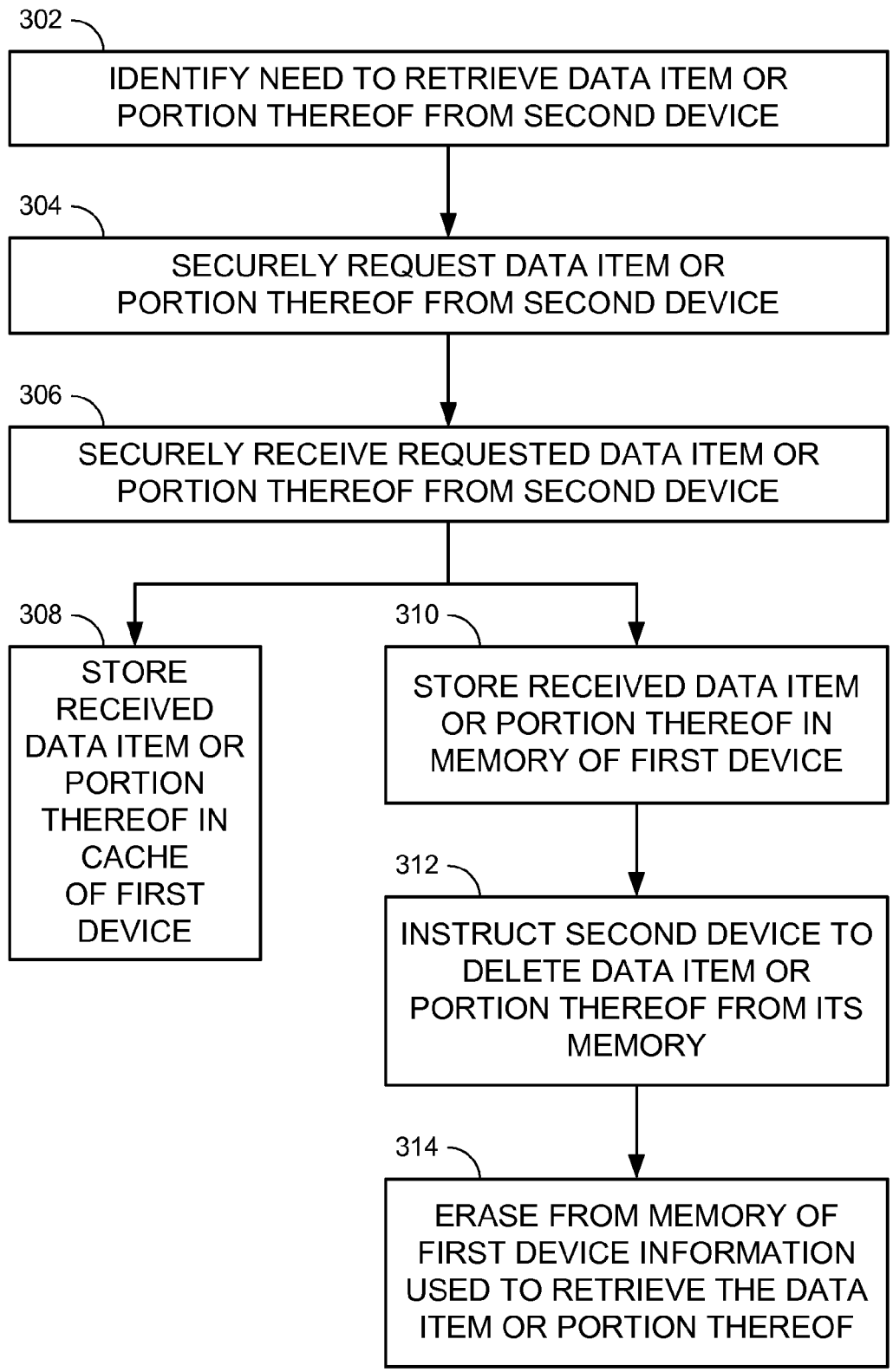
FIG. 3 is a flowchart of an exemplary method for retrieving data items or portions thereof from the wireless portable electronic device, according to some embodiments.

FIG. 3 is a flowchart of an exemplary method for retrieving data items or portions thereof from the wireless portable electronic device, according to some embodiments. Code 134 stored in memory 116 may implement the method of FIG. 3 in device 102.

At 302, device 102 identifies a need to retrieve a particular data item 135 or portion thereof from device 104. For example, this need may be identified from user input received via user input component 130. In another example, user data items of applications 133 of device 102 may be synchronized with one or more applications on another device, for example, a personal computer (not shown). If a particular user data item or a portion thereof is stored on device 104, and the synchronization application requests that particular user data item or portion thereof, then device 102 will identify a need to retrieve the particular user data item or portion thereof from device 104.

At 304, device 102 securely requests the particular data item 135 or portion thereof from device 104 over wireless communication link 106. The request is based, at least in part, on the information 138 related to the particular data item 135 or portion thereof. If no wireless communication link is established with device 104, or if the link is lost, for example, in the case where device 104 is out of the wireless communication range of device 102, the operation of retrieving the data item fails, and an error message may be displayed on device 102.

At 306, device 102 securely receives the particular data item 135 or portion thereof from device 104 over wireless communication link 106.

At 308, device 102 may store the particular data item 135 or portion thereof in cache 119. Applications 133 on device 102 may access the particular data item 135 or portion thereof until it is overwritten in cache 119. Memory 116 retains information 138 related to the particular data item 135 or portion thereof and memory 126 retains its copy of the particular data item 135 or portion thereof.

Alternatively, device 102 may store at 310 the particular data item 135 or portion thereof in memory 116, instruct device 104 at 312 to delete its copy of the particular data item 135 or portion thereof in memory 126, and at 314, erase from memory 116 information 138 related to the particular data item 135 or portion thereof.

The following is a non-exhaustive list of examples for rules that affect which data items or portions thereof are to be transmitted from the first device to the second device, and that affect when the first device identifies a need to retrieve a particular data item or portion thereof.

Rules for Messages

If the first device has at least one messaging application to handle e-mail messages, instant messages, peer-to-peer messages, and the like, then any or a combination of the following rules, presented below in no particular order, may apply.

(1) The first device may automatically store old messages on the second device. This may take effect periodically, or when a memory manager of the first device requires more memory. The received time, sender and subject may be retained on the first device, so that the user is able to identify the message in a list of messages on the first device, and the body of the message may be stored on the second device. When the user attempts to access the message on the first device, for example, by opening the message to view it or by searching for the message, the body of the message may be retrieved from the second device.

(2) The first device may retain a first portion of a message body, for example, of a predetermined size such as 2 Kb, and may store the remaining portion of the message body on the second device. The user may view the first portion of the message body on the first device, but as the user scrolls down past the first portion, the remaining portion or a next portion of the message will have to be retrieved from the second device in order for the user to view it. The first device will have stored information in its memory to enable the first device to retrieve the next portion or the remaining portion from the second device. The message displayed to the user, for example, via user output component 132, may have an indication that there are additional portions of the message body. The messaging application may automatically retrieve the next portion or the remaining portion from the second device when the user scrolls to the indication. Alternatively, the messaging application may wait for the user to provide input, for example, via user input component 130, that the user wants to have the next portion or the remaining portion of the message body retrieved from the second device.

(3) Messages may be marked with a timestamp indicating the time at which the message was last accessed by the user of the first device. Messages with a timestamp older than a predefined duration, for example, 30 days, may be automatically transmitted to the second device for storage therein.

(4) Message attachments may be automatically stored on the second device, rather than on the first device, and retrieved only when required, for example, when a message is being forwarded to another recipient. A threshold attachment size may be specified, wherein attachments larger than a threshold size may be automatically stored on the second device, and smaller attachments remain on the first device.

Rules for Calendar Appointments

If the first device has a calendar application, then any or a combination of the following rules, presented below in no particular order, may apply. Calendar appointments include calendar meetings.

(1) Calendar appointments for dates prior to a cut-off date may be automatically stored on the second device, since they are unlikely to be accessed frequently by the user. The cut-off date might be the current date, for example, such that all calendar appointments from past dates may be automatically stored.

(2) Calendar appointments for dates that are more than a predetermined time in the future, for example, more than 30 days, may be automatically stored on the second device. As the date of the calendar appointment approaches and is less than the predetermined time in the future, the calendar appointment may be automatically retrieved from the second device and stored solely on the first device.

(3) Notes of calendar appointments may be automatically stored on the second device, and retrieved from the second device only when the user attempts to access them.

Rules for Other User Data Items

Similar rules may be applied to user data items of other types.

Figure 4:
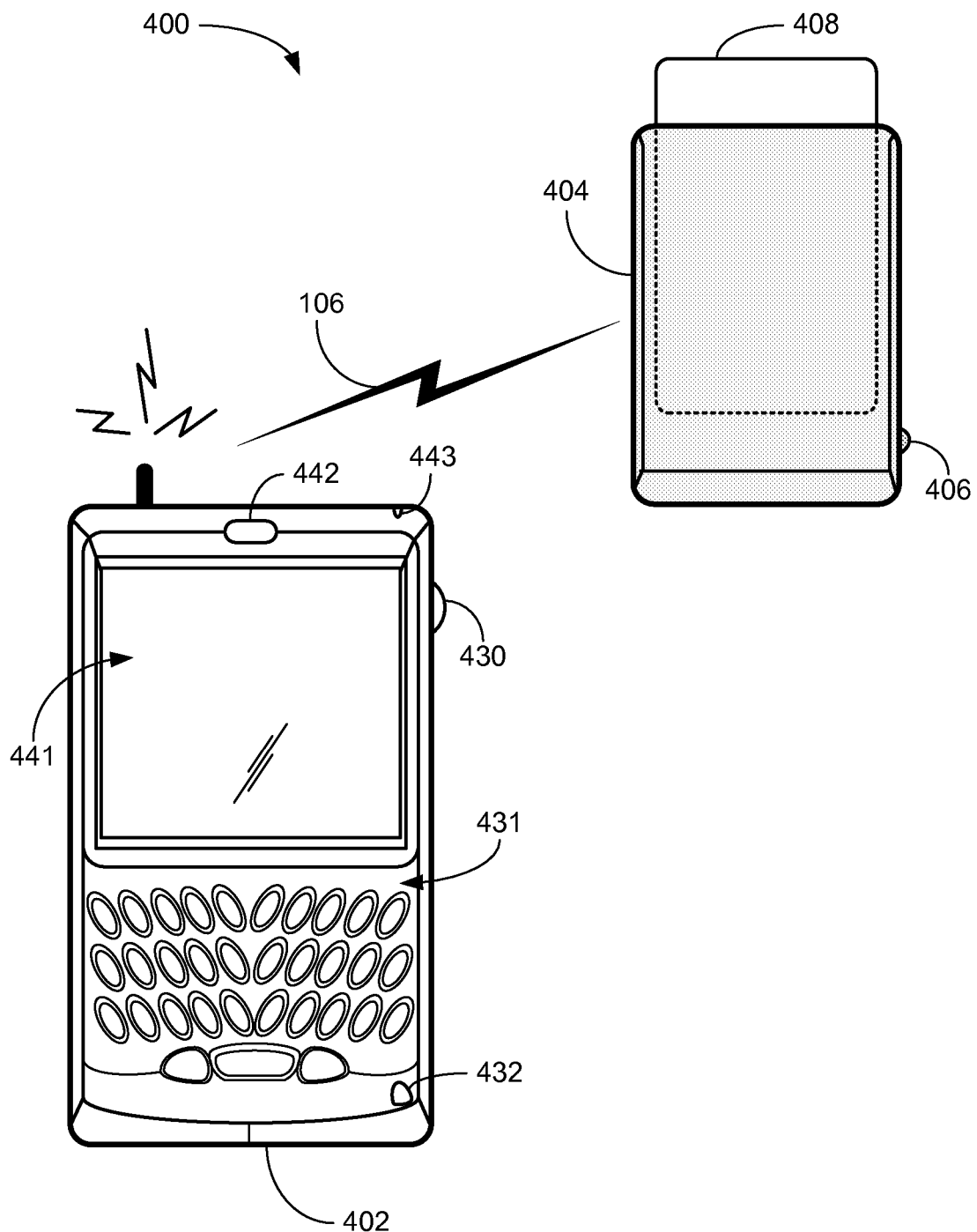
FIG. 4 is a schematic illustration of an exemplary communications system, according to some embodiments.

FIG. 4 is an illustration of an exemplary communication system 400, according to some embodiments. System 400 is similar to system 100 of FIG. 1, where device 102 is a mobile device 402, and device 104 is a wireless smart card reader 404. Mobile device 402 and smart card reader 404 are able to communicate securely over wireless communication link 106. In the example shown in FIG. 4, wireless smart card reader 404 has a user input component that is an electromechanical device 406, however, other and/or additional user input components are possible. Similarly, in the example shown in FIG. 4, mobile device 402 has user input components 130 that include a thumbwheel 430, a keyboard 431 and a microphone 432, and user output components 132 that include a display 441, a speaker 442, and a light emitting diode (LED) 443.

A smart card 408 is shown inserted into smart card reader 404. Smart cards are personalized security devices, defined by the ISO7816 standard and its derivatives, as published by the International Organization for Standardization. A smart card may have a form factor of a credit card and may include a semiconductor device. The semiconductor device may include a memory that can be programmed with security information (e.g., a private decryption key, a private signing key, biometrics, etc.) and may include a processor and/or dedicated logic, for example, dedicated decryption logic and/or dedicated signing logic. A smart card may include a connector for powering the semiconductor device and performing serial communication with an external device. Alternatively, smart card functionality may be embedded in a device having a different form factor and different communication protocol, for example a Universal Serial Bus (USB) device. The person whose security information is stored on smart card 408 may use smart card reader 404 for identification, to unlock mobile device 402, and to digitally sign and/or decrypt messages sent by mobile device 402. Smart card 408 may also include a random number generator.

For example, mobile device 402 may be able to send and receive e-mail messages via an e-mail server (not shown). If, for example, the Secure Multipurpose Internet Mail Extensions (S/MIME) protocol is used, e-mail messages received at mobile device 402 are encrypted using a symmetric algorithm with a random session key generated by the sender of the e-mail message. The e-mail message also includes the session key, encrypted using the public key of the recipient. Upon receipt of an encrypted e-mail message, mobile device 402 may extract the encrypted session key and send it to smart card reader 404 via communication link 106. Smart card reader 404 may send the encrypted session key to smart card 408, and the decryption engine of smart card 408 may decrypt the encrypted session key using the recipient's private decryption key, which is stored in smart card 408. Smart card reader 404 may retrieve the decrypted session key from smart card 408 and forward it to mobile device 402 via communication link 106 so that mobile device 402 can decrypt the received e-mail message. The smart card 408 may prevent unauthorized use of the recipient's private decryption key by requiring that a password or personal identification number (PIN) be supplied before allowing the decryption operation to proceed.

Similarly, to add a digital signature to an e-mail message being sent by mobile device 402, mobile device 402 may send a hash of the contents of the e-mail message to smart card reader 404 over communication link 106. Smart card reader 404 may pass the hash to smart card 408, which may produce a digital signature from the hash and the sender's private signing key, which is stored in smart card 408. Smart card 408 may then pass the digital signature to smart card reader 404, which may forward it to mobile device 402 via communication link 106 so that mobile device 402 can transmit it along with the e-mail message to the e-mail server. Again, smart card 408 may prevent unauthorized use of the recipient's private signing key by requiring that a password or PIN be supplied before allowing the signing operation to proceed.

The unencrypted message key should be sent securely over communication link 106 from smart card reader 404 to mobile device 402 to prevent a third party from retrieving the message key from communication link 106. Similarly, the hash to be signed should be sent authentically over communication link 106 from smart card reader 404 to mobile device 402 to prevent a third party from modifying the hash and thereby causing smart card 408 to produce a signature using a hash different from the hash of the intended message. Therefore communication link 106 may need to be secured using cryptographic techniques.

To secure communication link 106, smart card reader 404 may need to generate various cryptographic keys. For example, if smart card reader 404 and mobile device 102 are BT devices, then a relatively short (up to 16-digits) key may be used for a Pairing procedure. An additional layer of security for communication link 106 may involve encryption with one or more additional keys. These additional keys may be generated from a shared secret between smart card reader 404 and mobile device 402, and one or more symmetric keys based on this shared secret may be generated using known Diffie-Hellman and simple password exponential key exchange (SPEKE) methods and variants thereof. Moreover, random session keys may be generated for each individual communication session over communication link 106.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method to manage data storage of a first wireless portable electronic device, the method comprising:
   identifying a calendar appointment, stored in a memory of the first wireless portable electronic device, that is scheduled to occur on a future date that is more than a predetermined time in the future; and
   in response to identifying the calendar appointment:
      securely transmitting the calendar appointment over a wireless communication link to a second wireless portable electronic device that is within range of the first wireless portable electronic device;
      writing in the memory information used to retrieve the calendar appointment from the second wireless portable electronic device;

erasing from the memory the calendar appointment that was transmitted to the second wireless portable electronic device; and as the future date approaches and is no longer more than the predetermined time in the future, automatically retrieving the calendar appointment from the second wireless portable electronic device and storing the calendar appointment in the memory of the first wireless portable electronic device.

* * * * *

UNITED STATES PATENT AND TRADEMARK OFFICE
CERTIFICATE OF CORRECTION

PATENT NO. : 7,831,786 B2  
APPLICATION NO. : 11/382151  
DATED : November 9, 2010  
INVENTOR(S) : Neil Patrick Adams Page 1 of 1

It is certified that error appears in the above-identified patent and that said Letters Patent is hereby corrected as shown below:

Title Page, Item (56) References Cited should be added:
2004/0167941 Prahlad et al.

Signed and Sealed this
Fifteenth Day of February, 2011

David J. Kappos
*Director of the United States Patent and Trademark Office*